US012807134B2

(12) United States Patent
Roeber et al.

(10) Patent No.: US 12,807,134 B2
(45) Date of Patent: Nov. 24, 2026

(54) METHOD AND A SYSTEM FOR OPERATING A VEHICLE FOR A PARKING MANEUVER

(71) Applicant: Ford Global Technologies, LLC, Dearborn, MI (US)

(72) Inventors: Marc Roeber, Düsseldorf (DE); Florian Vieten, Meerbusch (DE)

( * ) Notice: Subject to any disclaimer, the term of this patent is extended or adjusted under 35 U.S.C. 154(b) by 16 days.

(21) Appl. No.: 19/059,616

(22) Filed: Feb. 21, 2025

(65) Prior Publication Data

US 2025/0296551 A1 Sep. 25, 2025

(30) Foreign Application Priority Data

Mar. 25, 2024 (DE) ........................ 102024108404.9

(51) Int. Cl.

*B60W 30/06* (2006.01)
*B60R 1/074* (2006.01)
*B60R 1/12* (2006.01)
*B60R 1/26* (2022.01)
*G06V 20/58* (2022.01)

(52) U.S. Cl.

CPC ............ *B60W 30/06* (2013.01); *B60R 1/074* (2013.01); *B60R 1/12* (2013.01); *B60R 1/26* (2022.01); *G06V 20/58* (2022.01); *B60R 2001/1253* (2013.01); *B60W 2420/403* (2013.01); *B60W 2554/80* (2020.02)

(58) Field of Classification Search

None

See application file for complete search history.

(56) References Cited

U.S. PATENT DOCUMENTS

| | | | | |
|---|---|---|---|---|
| 9,358,927 | B2 | 6/2016 | Haeussler | |
| 2017/0158136 | A1 | 6/2017 | Israel et al. | |
| 2020/0090517 | A1 * | 3/2020 | Cetin | G08G 1/143 |
| 2021/0030387 | A1 | 2/2021 | Andreyev et al. | |
| 2022/0020389 | A1 | 1/2022 | Lou | |
| 2022/0203896 | A1 * | 6/2022 | Choi | B60R 1/062 |
| 2024/0227675 | A1 * | 7/2024 | Inui | B62D 15/027 |

FOREIGN PATENT DOCUMENTS

| | | | |
|---|---|---|---|
| CN | 112660027 | B | 12/2022 |
| DE | 102009031809 | A1 | 1/2011 |
| WO | 20190141653 | A1 | 7/2019 |

* cited by examiner

*Primary Examiner* — Thomas S Mccormack

(74) *Attorney, Agent, or Firm* — Frank Lollo; Eversheds Sutherland (US) LLP

(57) ABSTRACT

The disclosure generally relates to a method and a system for operating a vehicle for a parking maneuver. The vehicle has at least one sensor, a folding exterior mirror and a control device coupled to the sensor. A parking trajectory of the vehicle for a parking maneuver is received or determined by the control device. At least one object in the external space of the vehicle is detected by the sensor. A distance between the folding exterior mirror and the object is determined along the parking trajectory by the control device. The folding exterior mirror will be folded along at least a section of the parking trajectory by the control device if the distance falls below a first minimum distance threshold value.

14 Claims, 4 Drawing Sheets

METHOD AND A SYSTEM FOR OPERATING A VEHICLE FOR A PARKING MANEUVER

CROSS-REFERENCE TO RELATED APPLICATIONS

Figure 1:
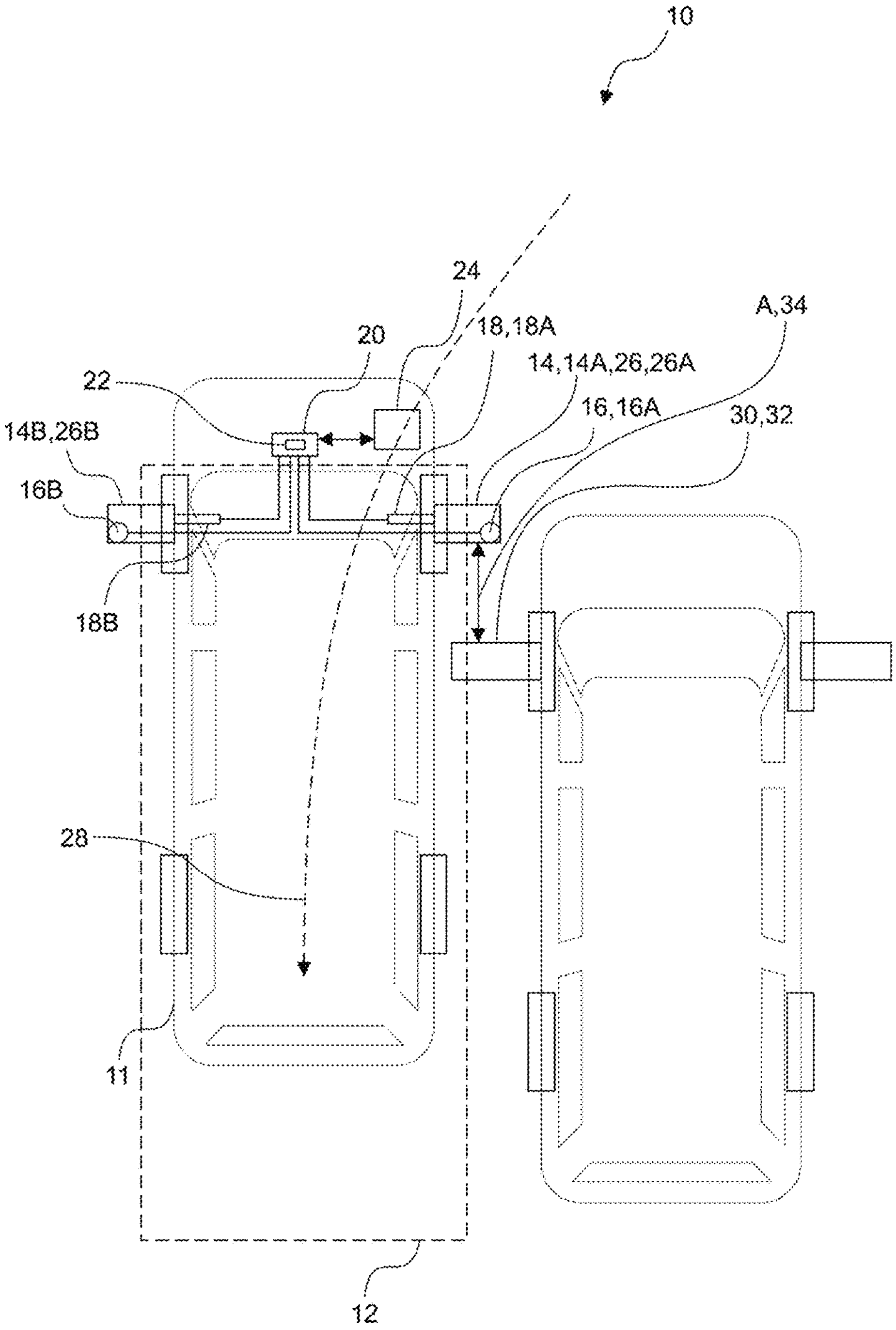

The present application claims priority to and the benefit of German Application No. 102024108404.9, filed on Mar. 25, 2024, which is hereby incorporated by reference herein in its entirety.

FIELD

The disclosure generally relates to a method and system for operating a vehicle for a parking maneuver.

BACKGROUND

In certain application scenarios, vehicles are to assume desired control positions by means of appropriate parking maneuvers, for example based on autonomous, partially autonomous or manual driving maneuvers (parking maneuvers or parking functionalities). The desired control positions can have dimensions that are only slightly larger than the dimensions of the underlying vehicles. Nevertheless, autonomous or partially autonomous driving rules can be set up to basically move the corresponding vehicle into the parking position. The vehicles to be parked typically have camera-based sensors for autonomous or partially autonomous driving maneuvers, which are regularly arranged in/on the exterior mirrors to be able to capture the surroundings of the vehicle to be parked in the best possible way.

In these exemplary applications, protruding obstacles may protrude into the control positions or at least partially be arranged in an (approximately) cuboid volume corresponding to the control position. For example, exterior mirrors of adjacent (parked) vehicles can only restrict the intended control position (parking position, parking space) of the vehicle under consideration in spatially limited sub-areas. On the one hand such obstacles may be arranged in such a way that, regarding its dimensions, the vehicle to be parked can in principle be arranged in the appropriate control position without contact with the obstacle. On the other hand, however, the parking trajectory required to move the relevant vehicle into the control position in question may, due to the obstacle, lead to contact or at least to an unintentionally small distance between the vehicle and the obstacle. In many previous approaches, the parking maneuvers are then not even started or are aborted, for example, to avoid the effect of a defect in sensors located in/on the exterior mirrors. This limits the number of possible applications.

DE 10 2021 117 012 A1 describes a system for controlling the side mirrors of a vehicle during automatic parking. The vehicle contains a sensor device and automatic parking control to generate a folding signal for the side mirror. The automatic parking control calculates a minimum folding distance based on the current speed of the vehicle, the distance between an object in the surroundings and the vehicle, and the time it takes to fold the side mirror. As a result, the side mirror is folded when a distance-dependent folding condition is met. However, this means that the side mirror is folded regardless of the actual necessity with regard to sections of the parking trajectory. In other words, it is not considered that folding the side mirror along a section of the parking trajectory is not necessary at all. However, folding prevents the provision of the side mirror-dependent functionalities, which limits the comfort of the vehicle user and the functionality of the vehicle.

DE 10 2009 031 809 A1 and KR 10-1762726 B1 disclose methods for determining distances and environmental data related to the surroundings of the vehicle, which can optionally be considered in the context of parking operations.

US 2022/0203896 A1, U.S. Pat. No. 9,358,927 B2, CN 112660027 B, US 2017/0158136 A1, US 2021/0303878 A1 and WO 2019/141653 A1 disclose further generic methods for parking a vehicle, in which side mirrors of the vehicle can be folded depending on various conditions. However, all approaches provide for a side mirror to be folded depending on the respective conditions along the entire, respective parking trajectories, which prevents the provision of the side mirror-based functionalities.

There is therefore a need to eliminate or at least reduce the disadvantages of known methods and systems for operating a vehicle for a parking maneuver. There is a need to create a method and a system with which the relevant distance can be determined more precisely than before, so that folding of the side mirror along the entire parking trajectory can be prevented.

SUMMARY

The objective is achieved by the subject-matter of the independent claims. Advantageous embodiments are given in the dependent claims and the description below, each of which can represent aspects of disclosure separately or in (sub) combination. Some features are explained in terms of method, others in terms of devices. However, the relevant aspects must be transferred between them in a suitable way.

According to one aspect, some embodiments of the disclosure relate to a method of operating a vehicle for a parking maneuver. The vehicle has at least one sensor, a folding exterior mirror and a control device coupled to the sensor. The method includes at least the following steps:

- A parking trajectory for a parking maneuver of the vehicle is received or determined by the control device.
- At least one object in the external space of the vehicle is detected by the sensor.
- A distance between the folding exterior mirror and the object is determined by the control device along the parking trajectory.
- The folding exterior mirror is folded by the control device along at least a section of the parking trajectory, provided that the distance falls below a first minimum distance threshold value.

As a result, a method is created according to which it is not necessary for the folding exterior mirror to be folded along the entire parking trajectory. In contrast to previous approaches, the exterior mirror is only folded along a section of the parking trajectory, at least if this is necessary depending on the distance between the folding exterior mirror and the object along the parking trajectory. As a result, the functionalities provided by components of the exterior mirror or the exterior mirror itself can be guaranteed for a vehicle user or driving control systems, at least along sections of the parking trajectory. This increases the comfort of the vehicle user compared to previous approaches. In addition, it also makes it possible to use underlying driving control systems with increased precision. These advantages are ensured in particular by the fact that, in contrast to previous approaches, the distance between the folding exterior mirror and the object is not determined per se, but this distance is determined along the parking trajectory. This makes it possible to determine the sections of the parking trajectory along which a folding exterior mirror must be folded because the distance for the corresponding sections falls below the first minimum distance threshold value. Therefore, the precision of the present method is increased compared to previous approaches by taking into account the parking trajectory in the context of determining the distance between the folding exterior mirror and the object.

In the present case, the distance determined by the control device between the folding exterior mirror and the object can be understood as the minimum distance between the folding exterior mirror and the object, i.e. the shortest free path length between the folding exterior mirror and the object.

In the present case, a parking maneuver is understood to be a deliberate driving maneuver of an underlying vehicle to move the vehicle into a desired control position (parking position, parking space, parking lot).

In the present case, the parking trajectory is understood to be the driving trajectory that extends between a starting position of the parking maneuver and the desired end position (parking position) of the parking maneuver to move the underlying vehicle from the starting position to the end position corresponding to the control position.

According to a further aspect, some embodiments of the disclosure concern a system for operating a vehicle for a parking maneuver. The vehicle has at least one sensor, a folding exterior mirror and a control device coupled to the sensor. The sensor is at least set up to detect at least an environment of the vehicle. The control device is at least set up to:

- receive or determine a parking trajectory of the vehicle for a parking maneuver,
- detect an object located within an external space of the vehicle based on sensor measurement data,
- determine a distance between the folding exterior mirror and the object along the parking trajectory, and
- fold the folding exterior mirror along at least a section of the parking trajectory, provided that the distance falls below a first minimum distance threshold value.

The advantages achieved by the method described herein are also achieved by the system in a corresponding manner.

Optionally, the control device can be set up in the present case to determine the parking trajectory independently. For example, measurement data of at least one sensor of the vehicle can be used to determine an appropriate parking trajectory that ensures that the vehicle can ultimately be positioned in the desired end position according to an intended control position. Typically, the actual position of the vehicle is considered as the starting position of the parking trajectory.

Alternatively, the control device may also be coupled to a higher-level vehicle control device, which is basically set up to determine the parking trajectory. The parking trajectory thus determined can then be transmitted by the vehicle control device to the control device of the present system/method. The vehicle control device can, for example, ensure other functionalities for the vehicle, such as autonomous or partially autonomous driving functions (automatic parking).

In another alternative, the control device can be in the form of part of the vehicle control device.

The detection of the object can be based on measurement data that the control device receives from the at least one sensor of the vehicle. The control device may be set up to be able to conclude from these measurement data that there is an object located at a certain position in the external space of the vehicle.

The folding exterior mirror can be folded, for example, by the control device emitting a folding signal to an actuator that is set up to ensure partial or full folding operations of the folding exterior mirror.

Preferably, the control device first determines the section of the parking trajectory along which the folding exterior mirror is to be folded depending on the distance determined. Considering the actual position of the vehicle along the parking trajectory, the control device can then output the folding signal in a demand-oriented manner to trigger the folding process of the folding exterior mirror. For example, the actual position of the vehicle along the parking trajectory can be determined by the control device based on sensor measurement data and/or based on vehicle position data.

Optionally, the distance is determined by the control device along at least one spatial direction, preferably along at least two mutually orthogonally oriented spatial directions, further preferably along at least three mutually orthogonally oriented spatial directions. This allows the partial distances along different spatial directions to be taken into account, so that the minimum distance between the folding exterior mirror and the object can be determined by the control device. Depending on the relative arrangements and dimensions of the folding exterior mirror and the object, the minimum distance does not have to be oriented along a specific spatial direction, for example the transverse direction of the vehicle. As a result, the precision of the method is thus increased, as the distance can be determined independently of the relative position and the respective dimensions of the folding exterior mirror and the object.

Preferably, the distance between the folding exterior mirror and the object is determined by the control device along the parking trajectory, taking into account an envelope of the folding exterior mirror. The envelope of the exterior mirror indicates the exterior contour (outer shape) of the exterior mirror, which is typically three-dimensional. This makes it possible to determine the distance between the folding exterior mirror and the object more precisely than before, since the minimum distance between the folding exterior mirror and the object does not necessarily have to extend from a reference point of the exterior mirror, but can start from a point on the outer contour of the folding exterior mirror by taking into account the envelope. The more precise distance determination also increases the precision of determining the section along which the folding exterior mirror is to be folded.

Particularly preferably, the envelope of the folding exterior mirror is taken into account when determining the distance between the folding exterior mirror and the object by the control device depending on the respective angular position of the exterior mirror. The envelope varies depending on the angular position of the exterior mirror, for example depending on the different angular positions that the exterior mirror assumes during a folding process or after the folding process has been completed. This opens the possibility of further increasing the precision of determining the relevant distance, as the distance can even be determined depending on the folding process of the exterior mirror, which takes place along a section of the parking trajectory. This allows the folding process to be carried out more in line with requirements than before, for example, since by considering the angle-dependent envelope of the folding exterior mirror, it may result that the section along which the folding exterior mirror is to be folded can be reduced by considering the envelope. In this way, the functionality of the exterior mirror or the functionalities of components arranged in/on the exterior mirror can be guaranteed over longer sections of the parking trajectory.

In some embodiments, the method can be developed by determining a typically three-dimensional envelope of the object by the control device based on sensor measurement data. The envelope of the object is considered when determining the distance between the folding exterior mirror and the object along the parking trajectory. As a result, the shape of the object can also be considered when determining the distance. This further increases the precision of the process, as the distance between the folding exterior mirror and the object can be determined more precisely than before.

Optionally, the section of the parking trajectory is minimized by the control device, considering a distance-dependent tolerance range. In other words, the control device may be set up to minimize the section along which the folding exterior mirror is to be folded. As a result, the functionalities provided by the folding exterior mirror for the vehicle user or a vehicle control device can be guaranteed in the best possible way.

When minimizing the section, a vehicle movement along the parking trajectory can be taken into account. This means that the section is optionally minimized only in such a way that the movement of the vehicle along the parking trajectory continues, and the vehicle does not necessarily have to be stationary for the purpose of minimization to achieve an absolutely minimized section.

When determining the distance by the control device, the duration of a folding operation of the folding exterior mirror is preferably taken into account. This opens the possibility of determining the section along which the folding exterior mirror is to be folded in such a way that it is minimized, considering the time required for the folding exterior mirror to be folded. In an exemplary embodiment, the vehicle can be moved along part of the parking trajectory and approach the point where the determined distance falls below the first minimum distance threshold value. The process of folding the folding exterior mirror is now started at a position along the parking trajectory, so that, taking into account the folding process, there is a distance between the folding exterior mirror and the object in such a way that the distance only falls below the first minimum distance threshold value at a later position along the parking trajectory, which further shortens the section. In other words, part of the parking trajectory is traversed while the folding operation is being carried out, i.e. during the folding operation duration. The control device can control the triggering of the folding process in such a way that the section along which the folding exterior mirror is folded is minimized, considering the time required for the folding process.

In a corresponding way, the method can also be designed in such a way that distances between the folding exterior mirror and the object up to contact are not taken into account, but time intervals that the vehicle needs during the parking maneuver along the parking trajectory are taken into account. The time for folding the exterior mirror is then determined by the duration of the folding process relative to the predetermined time at which the distance falls below the first minimum distance threshold value.

Optionally, a driving control signal is output by the control device depending on the distance. The parking trajectory can be varied and/or stopped based on the driving control signal. The driving control signal can be output by the control device to a higher-level vehicle control device, for example. The higher-level vehicle control device can, for example, perform autonomous or partially autonomous driving functions. For example, the vehicle control device can ensure the control of the vehicle according to the parking trajectory.

In some embodiments, the vehicle has several folding exterior mirrors. The method can then be applied in the same way with regard to the other folding exterior mirrors. The method is then set up in such a way that one or more of the folding exterior mirrors can be folded separately, mutually independently or together. This also ensures the functionality of the method with regard to other folding exterior mirrors. A separate distance to respected detected objects in the external space of the vehicle can be determined for each folding exterior mirror. This increases the variability of the method.

Preferably, the method may also include the step in which the parking maneuver is stopped by the control device if the distance falls below a second minimum distance threshold value. The second minimum distance threshold value is less than the first minimum distance threshold value. This means that contact between at least one folding exterior mirror and the object can no longer be prevented if the distance falls below the second minimum distance threshold value. In this case, the method is set up to detect that the intended parking trajectory is unsuitable for moving the vehicle into the desired control position without contact. As a result, the control device can, for example, output a driving control signal that causes a vehicle control device to stop or at least pause the parking maneuver.

The first minimum distance threshold value and/or the second minimum distance threshold value may be predetermined. For example, the first and/or second minimum distance threshold value may also depend on certain parameters, such as the type of vehicle.

In some embodiments, the control device may be set up to unfold the folding exterior mirror after completing the section of the parking trajectory. In this way, the functionalities provided by the folding exterior mirror can be guaranteed again, corresponding to additional sections of the parking trajectory.

Optionally, when determining the distance between the folding exterior mirror and the object, a confidence level regarding the position and/or the envelope of the object and/or a confidence level regarding the (angular position-dependent) envelope of the of the vehicle folding exterior mirror are considered. For example, the respective confidence levels can be increased by the fact that a component, such as the object in the external space of the vehicle, is detected independently by several sensors. In this case, the confidence level may be higher than in the case where the object is only detected by a single sensor. The confidence levels can be used to provide tolerance ranges for the determined distance relative to the first and/or second minimum distance threshold value. For example, if the respective confidence levels are low, larger tolerance ranges can be provided, while low tolerance ranges can be selected for high confidence levels.

The method is preferably set up for control positions in which the respective control position (parking position) provides for a vehicle arrangement that is orthogonally oriented to the vehicle orientation at the beginning of the method. In this case, the control position can describe, for example, a parking space that is arranged perpendicular to a roadway.

In an alternative, however, the method can also be applied to control positions where the respective control position (also known as the parking position) provides for a vehicle arrangement that is oriented parallel to the vehicle orientation at the beginning of the method. For example, the control position can describe a parking space that is parallel to a roadway, but is bordered laterally by an obstacle, such as a wall.

In some embodiments, the method can also be developed so that traffic in the surroundings of the vehicle is taken into account when performing the parking maneuver. For example, the process of folding the folding exterior mirror does not necessarily have to take place while the vehicle is moving. If it is determined that there is no traffic in the surroundings of the vehicle, the section along the parking trajectory along which the folding exterior mirror is to be folded can be further shortened by first moving the vehicle along the parking trajectory to a point where the exterior mirror can just be folded without contact between the folding exterior mirror and the object. At this position, the vehicle can then be halted or stopped, for example by a corresponding driving control signal, since no surrounding traffic in the surroundings of the vehicle is blocked, and the corresponding process of folding in the folding exterior mirror can then be triggered. As a result, the functionality of the exterior mirror can be guaranteed for an even longer section of the parking trajectory. This means that the section of the parking trajectory for which the folding exterior mirror must be folded will be further shortened.

Optionally, the method is in the form of a computer-implemented method. This means that the essential steps of the method can be carried out with the help of one or more data processing devices. Determining the distance and folding in the folding exterior mirror may be carried out with the help of one or more data processing devices. However, the other steps of the method may also be based on the use of data-processing devices.

According to a further aspect, the disclosure also relates to a computer program product containing commands which, when executed by a computer, cause the computer to carry out the method as described herein. The benefits achieved by the method described herein are also achieved in a corresponding manner by the computer program product.

According to a further aspect, the disclosure also relates to a computer-readable storage medium, containing commands which, when executed by a computer, cause the computer to carry out the method as described herein. The advantages achieved by the method described herein are also achieved in a corresponding manner by the computer-readable storage medium.

In exemplary embodiments, the at least one sensor of the vehicle can be a camera-based sensor, for example an environment camera, a radar, or a lidar.

Optionally, the folding exterior mirror has at least one sensor. For example, such sensors can be used to detect lines that bound the desired control position. On the basis of the present method, the functionality of the sensor can be guaranteed over as large a section of the parking trajectory as possible. This is where the advantages of the present method and the underlying system become apparent. If the exterior mirror is folded, parts of the vehicle surroundings can be obscured by the vehicle body, for example. The detection of the surroundings by means of the sensor located in/on the exterior mirror is limited as a result. However, since the exterior mirrors are only folded along a section of the parking trajectory in accordance with the method outlined here and the system outlined here, and this section can be minimized, the detection functionality of the sensor can be guaranteed over as wide a section of the parking trajectory as possible. As a result, the functionalities of the present method and the present system are increased compared to known approaches.

Preferably, the control device is also set up to output a driving control signal, based on which the parking trajectory can be varied or stopped. In particular, the control device is designed to output the driving control signal to a higher-level vehicle control device that performs autonomous or partially autonomous driving functions, such as an automatic parking system.

In some embodiments, the control device is at least also set up to determine several objects arranged within an external space of the vehicle on the basis of sensor measurement data, to determine several distances between the folding exterior mirror and the several objects along the parking trajectory in relation to the several objects, and to fold the folding exterior mirror along at least a section of the parking trajectory, provided that one of the distances falls below a first minimum distance threshold value. The functionality of the system or the underlying method is further expanded as a result. For example, the control position can represent a free parking space between vehicles arranged adjacent to each other. The vehicles arranged adjacent to each other may each have exterior mirrors that at least partially protrude into the space in between (the parking space).

Preferably, the vehicle has several folding exterior mirrors. The control device is then additionally set up to determine a distance between the other folding exterior mirrors and the object along the parking trajectory and to fold at least one folding exterior mirror along at least a section of the parking trajectory, provided that the respective distance falls below a first minimum distance threshold value. This increases the functionality of the system and thus of the method.

According to another aspect, the disclosure also applies to a vehicle with a system as explained above. The benefits achieved by the system (and method) described herein are also achieved in a corresponding manner by the vehicle.

For the purposes of disclosure, vehicles may include land vehicles, namely, inter alia, off-road and on-road vehicles such as passenger cars, buses, lorries and other commercial vehicles. Vehicles can be manned or unmanned. Vehicles can be at least partially electrically driven.

All the features explained regarding the various aspects can be combined individually or in (sub-)combination with other aspects.

BREIF DESCRIPTION OF THE DRAWINGS

Figure 2:
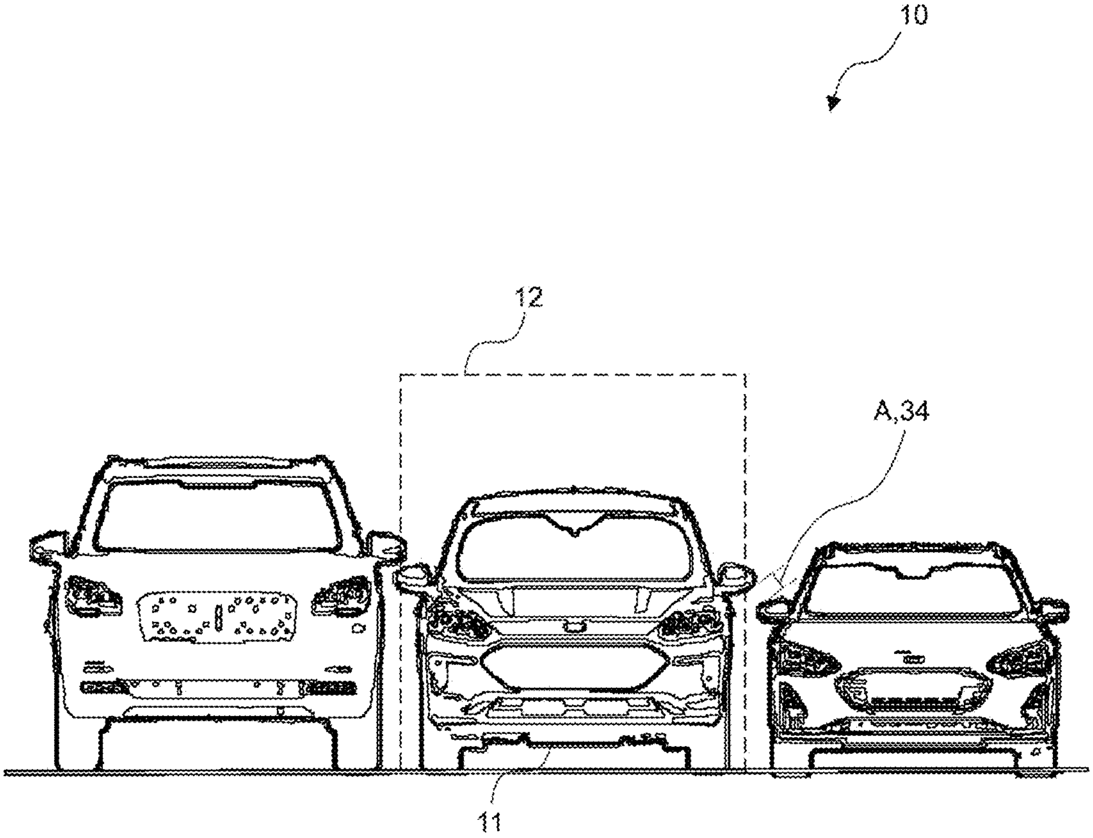
Figure 3:
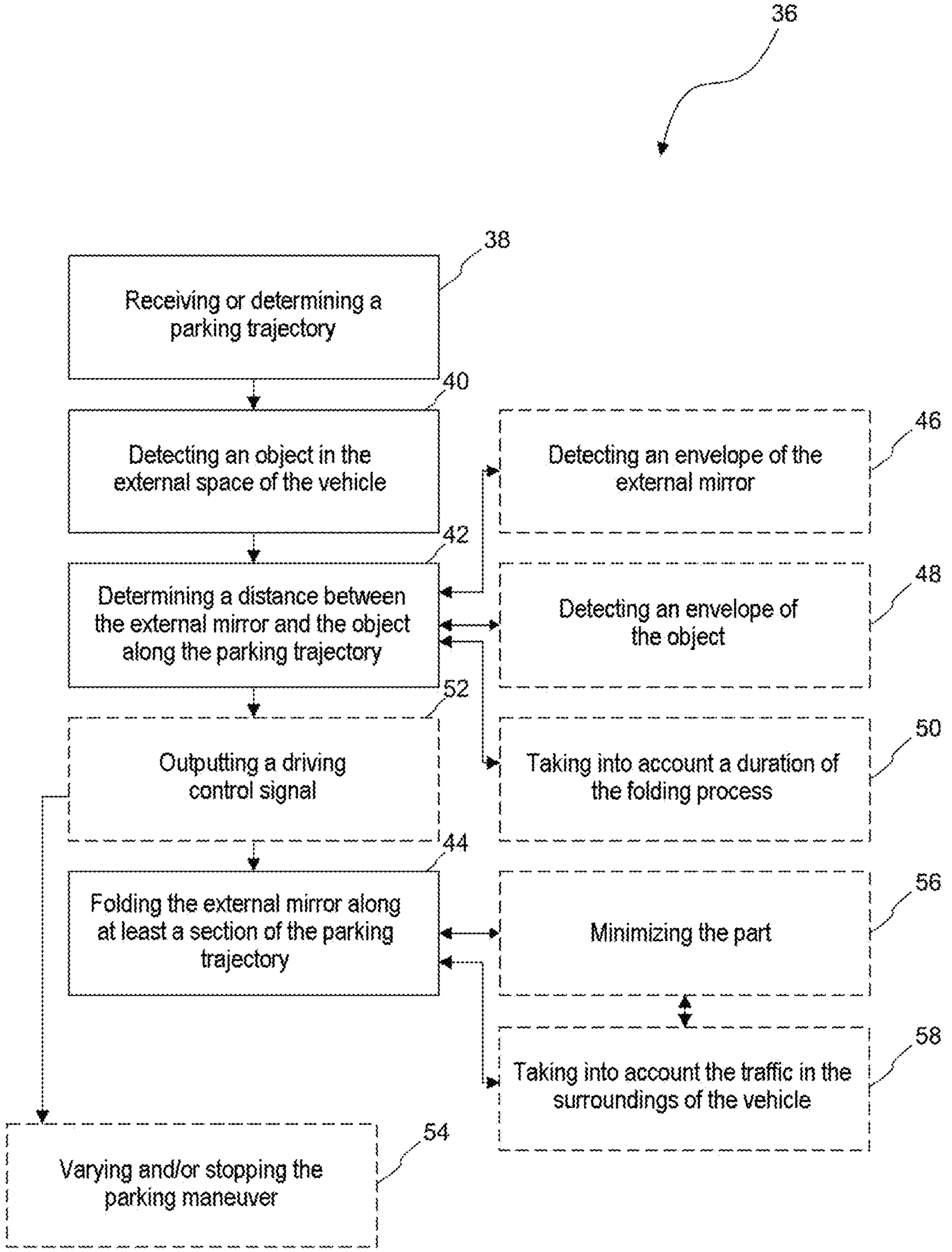
Figure 4:
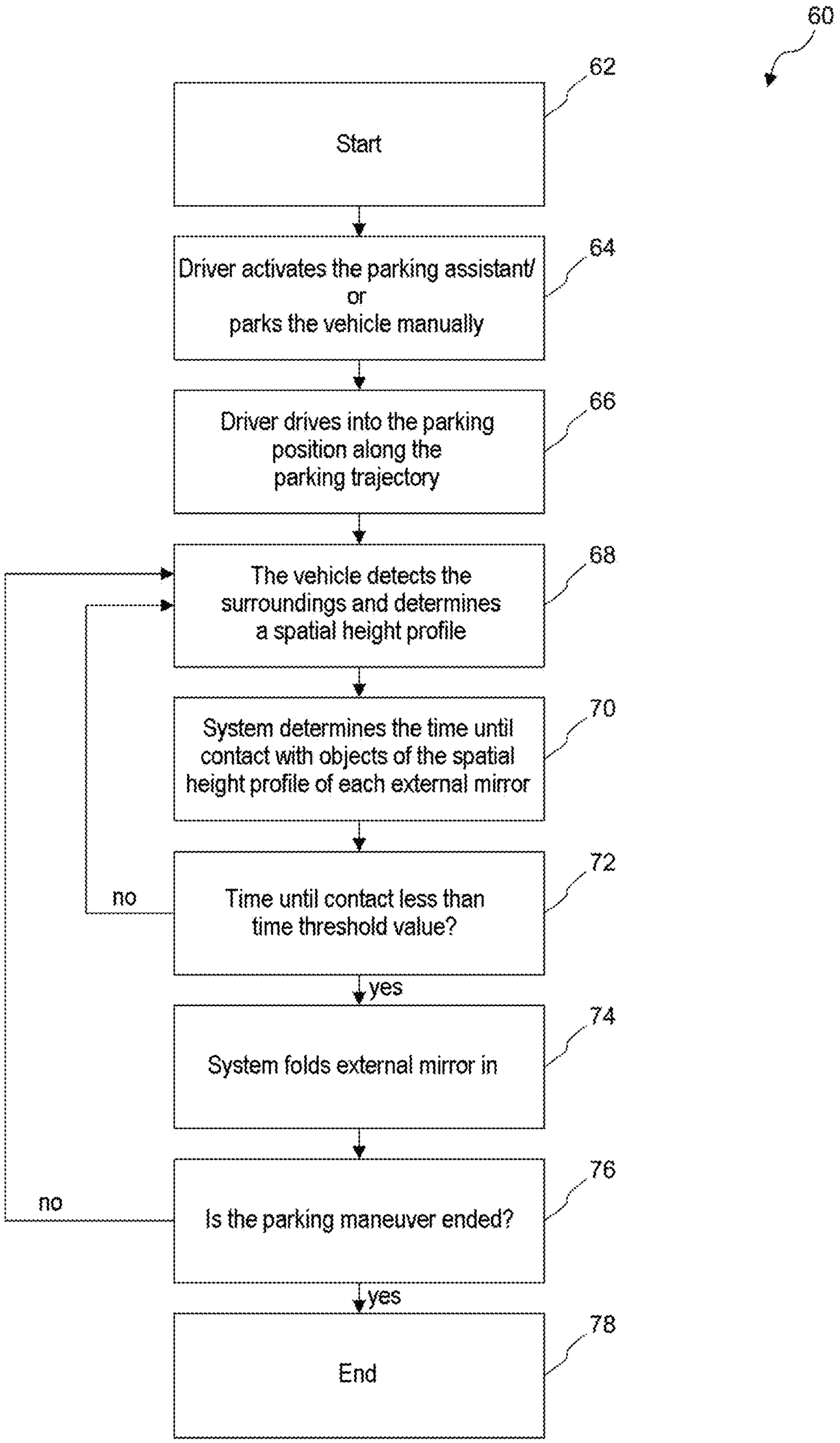

The disclosure as well as other advantageous embodiments and developments of the same are described and explained in more detail below using the examples shown in the drawings. In the figures:

FIG. 1 shows a simplified schematic representation of a system for operating a vehicle for a parking maneuver according to an embodiment of the disclosure, FIG. 2 shows a simplified schematic front view of a vehicle with a system according to an embodiment of the disclosure, FIG. 3 shows a simplified schematic representation of a method for operating a vehicle for a parking maneuver according to an embodiment of the disclosure, and FIG. 4 shows a simplified schematic representation of a method for operating a vehicle for a parking maneuver according to a further embodiment of the disclosure.

DETAILED DESCRIPTION

The detailed description below, in conjunction with the accompanying drawings, in which the same numbers refer to the same elements, is intended as a description of different embodiments of the disclosed object and is not intended to represent the individual embodiments. Each embodiment described in this disclosure is intended only as an example or illustration and should not be construed as favored or advantageous relative to other embodiments. The illustrative examples contained herein do not claim to be exhaustive and do not limit the claimed subject-matter to the exact disclosed forms. Various variations of the embodiments described are readily recognizable to the person skilled in the art and the general principles defined herein can be applied to other embodiments and applications without departing from the spirit and scope of the embodiments described. Therefore, the embodiments described are not limited to the embodiments shown but have the widest possible scope of application that is compatible with the principles and characteristics disclosed here.

All the features disclosed below in relation to the exemplary embodiments and/or accompanying figures may be combined, alone or in any sub-combination, with features of the aspects of the disclosure, including features of preferred embodiments, provided that the resulting combination of features is reasonable to a person skilled in the art in the field of technology.

For the purposes of the disclosure, the phrase “at least one of A, B and C” means, for example, (A), (B), (C), (A and B), (A and C), (B and C) or (A, B and C), including all other possible combinations if more than three elements are listed. In other words, the term “at least one of A and B” generally means “A and/or B”, namely “A” alone, “B” alone or “A and B”.

FIG. 1 shows a simplified schematic representation of a system 10 for operating a vehicle 11 for a parking maneuver according to an embodiment of the disclosure.

The system 10 can be in the form of part of the vehicle 11. The system 10 is set up to monitor and control a parking maneuver of the vehicle 11 in relation to a control position 12 (parking space). Even though the control position is shown here as a perpendicular control position 12, the system 10 can also be used in connection with parallel control positions 12. Alternatively, the system 10 can also be used with other orientations of control positions 12, for example diagonal parking, in which the control positions 12 are oriented diagonally (at an angle) to a roadway.

As part of the system 10, the vehicle 11 has folding exterior mirrors 14, 14A, 14B. According to the embodiment shown here, each folding exterior mirror 14 contains a sensor 16, 16A, 16B. The sensors 16 are in the form of environment cameras here, which are generally set up to optically capture the surroundings of the vehicle 11.

In an alternative, the vehicle 11 can also have more sensors 16, which can at least partially be arranged not in the folding exterior mirror 14 and can also use other detection techniques. For example, sensors 16 may be provided that detect the surroundings of the vehicle 11 based on radar or lidar.

Each folding exterior mirror is coupled to at least one actuator 18, 18A, 18B. The respective actuator 18 is set up to move the respective folding exterior mirror 14, to which it is assigned, at least between an unfolded position and a folded position. Of course, the actuators in 18 can also be set up to position the respective folding exterior mirrors 14 according to an intermediate position between end positions of the unfolded and folded positions.

The folding process of the folding exterior mirror 14 can be ensured, for example, by rotating the folding exterior mirror 14 around a vertical axis of the vehicle. Alternatively, the folding exterior mirror 14 can also be rotated around a rotation axis that is oriented differently, for example at an angle in space starting from a vehicle body.

As part of the system 10, the vehicle 11 also has a control device 20, which in this case is coupled to the actuators 18 and the sensors 16. The control device 20 has at least one data processing device 22. In general, the control device 20 is set up to carry out the method explained below.

According to the embodiment shown here, the vehicle 11 also has a vehicle control device 24, which ensures autonomous or at least partially autonomous driving functionalities. For example, the vehicle control device 24 here has a parking assistant that can be used to move the vehicle 11 to the control position 12. For example, the parking assistant can be used to move the vehicle 11 from a starting position of the parking maneuver, for example a position on a roadway of a street, to the control position 12 as the end position of the parking maneuver. In this context, the sensors 16 can be set up to detect line structures that bound the control positions 12. As a result, the parking maneuver can be adapted in such a way that the end position of the parking maneuver corresponds to a centered position of the control position 12, i.e. the vehicle is oriented in the middle of the control position 12, bounded by the line structures.

The folding exterior mirrors 14 of the vehicle 11 have a respective outer contour, which in the present case is referred to as an envelope 26, 26A, 26B. In this respect, the envelope describes the three-dimensional outer surface (outer contour) of the respective folding exterior mirror 14.

In general, the vehicle 11 is moved along a parking trajectory 28 to the control position 12. During the parking maneuver along the parking trajectory 28, the control device 20 can perform functions to ensure the method as shown below. According to the present embodiment, the control device 20 can determine the parking trajectory 28 independently, for example based on sensor 16 measurement data, or the control device 20 of the system 10 can receive the corresponding parking trajectory 28, for example from the vehicle control device 24.

In the present case, another vehicle is arranged adjacent to the control position 12, the exterior mirror of which as the object 30 protrudes at least partially into a cuboid volume corresponding to the control position 12. The object 30 can be detected by the system 10, for example, using a sensor 16. The system 10 is also set up to detect or determine a (three-dimensional) envelope 32 of the object 30.

Based on the measurement data relating to the object 30, the distance A, 34 between the folding exterior mirror 14 of the vehicle 11 and the object 30 along the parking trajectory 28 can be determined by the control device 20 of the system 10. “Along the parking trajectory 28” here means that the distance 34 can be determined in advance for different positions of the vehicle 11 along the parking trajectory 28, before the vehicle 11 has even taken up the respective position.

This opens the possibility of evaluating the development of the distance 34 and determining whether and when contact between the folding exterior mirror 14 of the vehicle 11 under consideration and the object 30 can occur or when the distance will fall below a minimum distance threshold value.

If the distance 34 falls below a corresponding minimum distance threshold value, the control device 20 may be set up to output a corresponding folding signal to the respective actuator 18 to initiate a folding operation of the desired folding exterior mirror 14. By folding the folding exterior mirror 14, the external dimensions of the vehicle 11 are reduced, so that contact between the vehicle 11 and the object 30 can be prevented.

FIG. 2 shows a simplified schematic front view of a vehicle 11 with a system 10 according to an embodiment of the disclosure. In accordance with this embodiment, the control position 12 not only contains a two-dimensional parking space on which the vehicle 11 is to be arranged, but also extends upwards, so that a cuboid volume can be assigned to the control position 12, which is evaluated and assessed regarding corresponding objects 30.

It is also made clear here that the method described in more detail below is not limited such that the distance 34 between the folding exterior mirror 14 and the object 30 must be oriented along a specific spatial direction. Rather, the distance 34 can be determined along three spatial directions oriented in pairs orthogonally to each other, so that, to put it precisely, the minimum distance between the folding exterior mirror and the object 30 along the parking trajectory 28 is generally determined. This determined minimum distance can then be compared with corresponding minimum distance threshold values to subsequently influence the parking maneuver, for example by means of a folding operation of a folding exterior mirror 14.

FIG. 3 shows a simplified schematic representation of 36 for operating a vehicle 11 for a parking maneuver according to an embodiment of the disclosure. Optional steps are shown in dashed form.

In step 38 of the method 36, a parking trajectory 28 of the vehicle 11 for a parking maneuver is first received or determined by the control device 20 of the vehicle 11. To determine the parking trajectory 28 independently, the control device 20 can, for example, use measurement data of the vehicle sensors 16. For example, line structures can be detected that bound the control position 12 so that the optimized final parking position of the parking maneuver (end position of the parking trajectory 28) can be determined. Alternatively, the control device 20 can also receive the parking trajectory 28 from the vehicle control device 24, for example because the latter has a parking assistant that determines the parking trajectory 28.

In the subsequent step 40, at least one object 30 in the external space of the vehicle 11 is detected by at least one sensor 16 of the vehicle 11. The corresponding measurement data indicating the object 30 in the external space of the vehicle 11 are transmitted to the control device 20. Based on the received measurement data, the control device 20 determines that the object 30 is located at a specific position in the external space of the vehicle 11.

The method 36 then includes the step 42, in which a distance 34 between the folding exterior mirror 14 and the object 30 along the parking trajectory 28 is determined by the control device 20. For this purpose, in particular the control device 20 can consider data of the vehicle 11, such as the dimensions thereof.

Optionally, the step 42 can also be developed in many ways. For example, step 42 can be designed in such a way that, according to the optional step 46, an envelope 26 of the exterior mirror 14 is considered, for which the distance 34 with respect to the object 30 is determined.

Here the envelope 26 can also be considered in accordance with different angular positions of the exterior mirror 14, wherein the different angular positions can occur during a folding operation of the exterior mirror 14. In an example scenario, a first edge of the outer surface of the folding door mirror 14 can be furthest from the vehicle hull when the folding wing mirror 14 is unfolded. However, after the folding process has been completed, a different outer edge of the outer surface of the folding exterior mirror 14 may be furthest away from the vehicle fuselage when the folding exterior mirror 14 is folded. Since the folding process of the folding exterior mirror 14 has an influence on the outer contour of the folding exterior mirror 14, the consideration of the angle-dependent, three-dimensional envelope 26 means that the distance 34 to the object 30 can be determined more precisely. For example, the envelope 26 can be determined based on sensor 16 measurement data or it can even be predetermined.

Optionally, step 42 can also be developed by determining an envelope 32 of the object 30 according to the optional step 48, in particular a three-dimensional envelope 32. This also leads to an increase in precision in determining the distance 34 between the folding exterior mirror 14 and the object 30. For example, the envelope 32 can be determined by using sensor 16 measurement data.

Furthermore, step 42 can be developed by the optional step 50, in which a duration of a folding operation of the folding exterior mirror 14 is considered when determining the distance 34 along the parking trajectory 28 by the control device 20. During the period of folding the exterior mirror 14, the vehicle 11 can optionally move along the parking trajectory 28. For example, by considering the duration, it can be determined when a process of folding the folding exterior mirror 14 must be initiated to ensure a sufficient distance 34 so that contact between the folding exterior mirror 14 and the object 30 is prevented.

The method 36 also includes at least the step 44, in which the folding exterior mirror 14 is folded along at least a section of the parking trajectory 28 by the control device 20, provided that the distance 34 falls below a first minimum distance threshold value. According to the present embodiment, the first minimum distance threshold value is predetermined. To initiate the folding operation of the folding exterior mirror 14, the control device 20 can output a folding signal to the actuator 18 assigned to the corresponding folding exterior mirror 14. The precise determination of the distance 34 makes it possible for the folding exterior mirror 14 to be folded only along a section of the parking trajectory 28. This means that the functionalities provided by the folding exterior mirror 14 can be provided along a larger part of the parking trajectory 28 compared to previous approaches. This increases user comfort and allows driving control functions to be performed for longer and more precisely than before.

The method 36 can also be developed with regard to step 44 by the optional step 56, in which the section of the parking trajectory 28 along which the folding exterior mirror 14 is folded is minimized by the control device 20, taking into account a distance-dependent tolerance range. However, the control device 20 can take into account the movement of the vehicle along the parking trajectory 28 here. This means that the control device 20 takes into account the time it takes to fold the folding exterior mirror 14, during which time the vehicle 11 moves along the parking trajectory 28. This means that the section is kept as short as possible, taking into account the movement of the vehicle. This is made possible by the fact that the distance 34 is determined not only to specific positions of the vehicle 11 relative to the object 30, but along the entire parking trajectory 28. In this way, the functionalities of the folding exterior mirror can be guaranteed over the largest possible part of the parking trajectory 28.

Alternatively, step 44 of the method 36 can also be developed by the optional step 58, in which traffic in the surroundings of the vehicle 11 is taken into account for the folding of the folding exterior mirror 14. For example, the traffic in the surroundings of the vehicle 11 can be detected based on sensor 16 measurement data. If the sensor 16 measurement data show that there is no or little traffic in the surroundings of the vehicle 11, the section can be further minimized in step 44 by first moving the vehicle to the position along the parking trajectory 28 where the folding exterior mirror 14 can just be folded without contact. Then the folding exterior mirror 14 can be folded when the vehicle 11 is stationary. This means that the vehicle will not move further along the parking trajectory 28 during the period of folding in the exterior mirror 14. As a result, the section along which the folding exterior mirror 14 must be folded can be minimized.

The method 36 can also be developed by the optional step 52, which precedes step 44 and according to which a driving control signal is output by the control device 20. For example, the driving control signal can be output to the vehicle control device 24.

According to the optional step 54, the parking maneuver can be varied and/or stopped based on the driving control signal. This allows the driving control signal to be used to vary and/or stop a mechanism of a parking assistant if the control device 20 detects that the distance 34 along the parking trajectory 28 is becoming unintentionally small. For example, a second minimum distance threshold value may be provided, which is less than the first minimum distance threshold value and which indicates that contact between the vehicle 11 and the object 30 is highly likely. In this case, the control device 20 can use the driving control signal to influence the parking maneuver and vary and/or stop it.

FIG. 4 shows a simplified schematic representation of a method 60 for operating a vehicle 11 for a parking maneuver according to a further embodiment of the disclosure. The method 60 corresponds to a user-oriented execution of the mechanisms presented here.

In step 62, the method 60 is started.

In the following step 64, a driver of the vehicle 11 activates a parking assistant or parks the vehicle 11 manually according to the control position 12. For example, the parking assistant can be part of a driving control device 24.

In the following step 66, the vehicle 11 moves into the control position 12 along the parking trajectory 28.

The method 60 continues with step 68, in which the vehicle 11 uses the system 10 to record the environment of the vehicle 11 and creates a spatially resolved elevation profile based on sensor 16 measurement data using the control device 20.

In the following step 70, the system 10 determines the time until a contact of the vehicle 11, for example by means of a folding exterior mirror 14, with objects 30 that were detected as part of the spatially resolved height profile. The time is determined separately for each folding exterior mirror 14. The respective durations are determined using the control device 20.

In the following step 72, the control device 20 assesses whether the time until contact with the respective object 30 is less than a time threshold value. The time threshold value is determined by the time required for the folding operation of the folding exterior mirror 14. If the condition of step 72 is not met, the method 60 includes a return to step 68 starting from step 72.

If the condition from step 72 is met, the method 60 continues with the subsequent step 74, in which the respective folding exterior mirror 14 will be folded by the system 10. To do this, the control device 20 initiates a corresponding folding signal, which outputs to the respective actuator 18.

The method 60 then includes step 76, in which the control device 20 determines whether the parking maneuver has been completed in accordance with the parking trajectory 28. If the condition from step 76 is not met, the method 60 includes a return to step 68 starting from step 76.

If the condition from step 76 is met, the method 60 is terminated in step 78.

Specific embodiments disclosed herein, in particular the control device, use circuits (for example, one or more circuits) to implement standards, protocols, methods, or technologies disclosed herein, to functionally couple two or more components, to generate information, to process information, to analyze information, to generate signals, to encode/decode signals, to convert signals, to transmit and/or receive signals, to control other devices, etc. Circuits of any kind can be used.

In one embodiment, a circuit such as the control device contains, but is not limited to, one or more data processing devices such as a processor (for example, a microprocessor), a central processing unit (CPU), a digital signal processor (DSP), an application-specific integrated circuit (ASIC), a field-programmable gate array (FPGA), a system on a chip (SoC), or similar, or any combination thereof, and can contain discrete digital or analog devices. circuit elements or electronics or combinations thereof. In one embodiment, the circuit contains hardware circuit implementations (for example, implementations in analog circuits, implementations in digital circuits, and the like, and combinations thereof).

In one embodiment, circuits contain combinations of circuits and computer program products with software or firmware instructions stored in one or more computer-readable memories and work together to cause a device to carry out one or more of the protocols, the methods, or technologies described herein. In one embodiment, the circuit technology contains circuits, such as microprocessors or parts of microprocessors, which require software, firmware, and the like to operate. In one embodiment, the circuits contain one or more processors or parts thereof and the associated software, firmware, hardware, and the like.

This disclosure can refer to quantities and numbers. Unless expressly stated, such quantities and numbers are not to be regarded as limiting, but as examples of the possible quantities or numbers in connection with the disclosure. In this context, the term "plurality" can also be used in the disclosure to refer to a quantity or number. In this context, the term "plurality" refers to any number that is greater than one, for example two, three, four, five, etc. The terms "about", "approximately", "close to", etc. mean plus or minus 5% of the stated value.

Although the disclosure has been presented and described in relation to one or more embodiments, after reading and understanding this description and the accompanying drawings, the person skilled in the art will be able to make equivalent changes and modifications.

The invention claimed is:

1. A method for operating a vehicle for a parking maneuver, wherein the vehicle has at least one sensor, a folding exterior mirror and a control device coupled to the sensor, wherein the method includes at least the following steps:

determining a parking trajectory of the vehicle for a parking maneuver by the control device, detecting at least one object in the external space of the vehicle by the sensor, determining a distance between the folding exterior mirror and the object along the parking trajectory by the control device, and folding the folding exterior mirror along at least a section of the parking trajectory by the control device, provided that the distance falls below a first minimum distance threshold value, wherein the section of the parking trajectory is minimized by the control device taking into account a distance-dependent tolerance range.

2. The method according to claim 1, wherein the distance is determined by the control device along at least one spatial direction, preferably along at least two mutually orthogonally oriented spatial directions, further preferably along at least three mutually orthogonally oriented spatial directions.

3. The method according to claim 1, wherein the distance between the folding exterior mirror and the object along the parking trajectory is determined based on an envelope of the folding exterior mirror.

4. The method according to claim 1, further comprising:

determining an envelope of the object by the control device based on sensor measurement data, wherein the envelope of the object is taken into account in determining the distance between the folding exterior mirror and the object along the parking trajectory.

5. The method according to claim 1, wherein, when determining the distance by the control device, a duration of a folding operation of the folding exterior mirror is taken into account.

6. The method according to claim 1, wherein a driving control signal is output by the control device depending on the distance, wherein the parking trajectory can be varied based on the driving control signal.

7. The method according to claim 1, wherein the vehicle has a second exterior folding mirror that is folded along at least a second section of the parking trajectory by the control device, wherein the folding exterior mirror and the second folding exterior mirror are configured to be folded independently or together.

8. The method according to claim 1, further comprising:

stopping the parking maneuver by the control device when the distance falls below a second minimum distance threshold value, wherein the second minimum distance threshold value is less than the first minimum distance threshold value.

9. A system for operating a vehicle for a parking maneuver, comprising:

at least one sensor, wherein the at least one sensor is configured to detect at least an environment of the vehicle a folding exterior mirror;

a control device coupled to the sensor, wherein the control device is at least set up to:

receive or determine a parking trajectory of the vehicle for a parking maneuver;

detect an object arranged within an external space of the vehicle based on sensor measurement data, determine a distance between the folding exterior mirror and the object along the parking trajectory, fold the folding exterior mirror along at least a section of the parking trajectory, provided that the distance falls below a first minimum distance threshold value, and based on at least one of the distances falling below a first minimum distance threshold value, determine several objects arranged within an external space of the vehicle on the basis of sensor measurement data, determine several distances between the folding exterior mirror and the several objects along the parking trajectory with respect to the several objects, and fold the folding exterior mirror along at least a section of the parking trajectory.

10. The system according to claim 9, wherein the folding exterior mirror includes the at least one sensor.

11. The system according to claim 9, wherein the control device is further set up to output a driving control signal on the basis of which the parking trajectory can be varied or stopped.

12. The system according to claim 10, further comprising a second exterior folding mirror, wherein the control device is further set up folded the second folding exterior mirror along at least a second section of the parking trajectory by the control device.

13. The system according to claim 12, wherein the folding exterior mirror and the second folding exterior mirror are configured to be folded independently or together.

14. The system according to claim 9, wherein the control device further set up, stop the parking maneuver when the distance falls below a second minimum distance threshold value, wherein the second minimum distance threshold value is less than the first minimum distance threshold value.

* * * * *